(12) United States Patent
Blohm et al.

(10) Patent No.: US 8,630,989 B2
(45) Date of Patent: Jan. 14, 2014

(54) SYSTEMS AND METHODS FOR INFORMATION EXTRACTION USING CONTEXTUAL PATTERN DISCOVERY

(75) Inventors: Sebastian Johannes Blohm, Munich (DE); Vivian Yaw-Wen Chu, San Jose, CA (US); Ching-Tien Ho, San Jose, CA (US); Yunyao Li, San Jose, CA (US); Huaiyu Zhu, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/117,570

(22) Filed: May 27, 2011

(65) Prior Publication Data

US 2012/0303661 A1 Nov. 29, 2012

(51) Int. Cl.
*G06F 17/30* (2006.01)

(52) U.S. Cl.
USPC .......................................... 707/705; 707/776

(58) Field of Classification Search
USPC ................................................ 707/705, 776
See application file for complete search history.

(56) References Cited

U.S. PATENT DOCUMENTS

| | | | |
|---|---|---|---|
| 6,430,547 B1 * | 8/2002 | Busche et al. | 707/776 |
| 7,162,465 B2 * | 1/2007 | Jenssen et al. | 1/1 |
| 7,689,638 B2 | 3/2010 | Theimer et al. | |
| 7,707,221 B1 * | 4/2010 | Dunning et al. | 707/770 |
| 7,756,874 B2 * | 7/2010 | Hoekman et al. | 707/737 |
| 7,756,890 B2 * | 7/2010 | Carter | 707/776 |
| 7,853,578 B1 * | 12/2010 | Anker et al. | 707/706 |
| 7,882,128 B2 * | 2/2011 | Bollinger et al. | 707/776 |
| 7,899,842 B2 | 3/2011 | Boyce | |
| 7,912,705 B2 | 3/2011 | Wasson et al. | |
| 7,912,854 B2 * | 3/2011 | Owens et al. | 707/776 |
| 2006/0253274 A1 | 11/2006 | Miller | |
| 2007/0100937 A1 | 5/2007 | Burtner et al. | |
| 2008/0059590 A1 | 3/2008 | Sarafijanovic et al. | |
| 2009/0125542 A1 * | 5/2009 | Loeser et al. | 707/102 |
| 2009/0187560 A1 | 7/2009 | Arning et al. | |
| 2009/0198646 A1 | 8/2009 | Krishnamurthy et al. | |
| 2010/0180199 A1 | 7/2010 | Wu et al. | |
| 2011/0066631 A1 | 3/2011 | Choi et al. | |
| 2011/0066637 A1 | 3/2011 | Wang | |
| 2011/0078554 A1 | 3/2011 | Nie et al. | |
| 2012/0054135 A1 * | 3/2012 | Salaka et al. | 706/13 |

OTHER PUBLICATIONS

Hones, Frank, et al., "Text string extraction within mixed-mode documents", Proceedings of the Second International Conference on Document Analysis and Recognition, Oct. 20-22, 1993, 5 pages, IEEE, Tsukuba Science City, Japan.

Kwasny, Stan, et al., "Rules for Automatic Mapping between Fast and Slow Speech", IPCOM000148946D, Jul. 31, 1985, 27 pages, Database entry Copyright (c) Software Patent Institute, electronic publication Mar. 30, 2007.

(Continued)

*Primary Examiner* — Kim Nguyen
(74) *Attorney, Agent, or Firm* — Ference & Associates LLC

(57) ABSTRACT

Described herein are methods, systems, apparatuses and products for automatically discovering patterns in a text corpus. An aspect provides extracting at least one context string related to at least one annotator from the at least one text corpus; analyzing the at least one context string for at least one sequence, the at least one sequence comprised of at least one subsequence; determining at least one sequence signature for each at least one sequence by applying applicable rules to the at least one sequence; and grouping the at least one sequence signature into at least one group.

10 Claims, 14 Drawing Sheets

(56) References Cited

OTHER PUBLICATIONS

Li. Chen, at al., "VGRAM: Improving Performance of Approximate Queries on String Collections Using Variable-Length Grams", Proceedings of the 33rd International Conference on Very Large Data Bases, Sep. 23-28, 2007, 12 pages, ACM, New York, New York.

Das, Abhinandan, et al., "Google News Personalization: Scalable Online Collaborative Filtering". Proceedings of the 16th International Conference on World Wide Web, May 8-12, 2007, 10 pages, ACM, New York, New York.

Silva, Yasin N., et al., "Similarity Group-by", 25th International Conference on Data Engineering, Mar. 29-Apr. 2, 2009, 12 pages, IEEE, Shanghai, China.

Banko, M., et al., "Open Information Extraction from the Web", Proceedings of International Joint Conference on Articifical Intelligence (IJCAI), 2007, 8 pages, Morgan Kaufmann, Waltham, Massachusetts, USA.

Chen, J., et al., "Unsupervised Feature Selection for Relation Extraction", Second International Joint Conference on Natural Language Processing: Companion Volume including Posters/Demos and tutorial abstracts, Oct. 11-13, 2005, 7 pages, Jeju Island, Republic of Korea.

Davidov, D. et al., "Unsupervised Discovery of Generic Relationshps Using Pattern Clusters and its Evaluation by Automatically Generated SAT Analogy Questions", Proceedings of Association for Computational Linguistics, Jun. 2008, pp. 692-700, Columbus, Ohio, USA.

Etzioni: O. et al., "Unsupervised named-entity extraction from the Web: An experimental study", Artificial Intelligence 165, Apr. 14, 2005, pp. 91-134, Elsevier B,V., Amsterdam, Netherlands.

Gormley, M. et al., "Non-Expert Correction of Automatically Generated Relation Annotations", Proceedings of the NAACL HLT 2010 Workshop on Creating Speech and Language Data with Amazon's Mechanical Turk, Jun. 2010, pp. 204-207, Los Angeles, California, USA.

Hasegawa et al, Discovering relations among named entities from large corpora. In Proceedings (of the 42nd Annual Meeting on Association for Computational Linguistics), ACL 2004, 9 pages.

Jindal, N., et al., "Mining Comparative Sentences and Relations", American Association for Artificial Intelligence (21st National Conference on Artificial Intelligence), 6 pages, 2006.

Kok, S., et al., "Extracting Semantic Networks from Text Via Relational Clustering", ECML/PKDD (European Conference on Machine Learning and Principles and Practice of Knowledge Discovery in Databases, Antwerp, Belgium), 2008, 17 pages.

Minkov, E., et al.. "Extracting Personal Names from Email: Applying Named Entity Recognition to Informal Text", Proceedings of Human Language Technology Conference and Conference on Empirical Methods in Natural Language Processing, Oct. 2005, pp. 443-450, Vancouver.

Nanopoulos, A., et al., "A Data Mining Algorithm for Generalized Web Prefetching", IEEE Transactions on Knowledge and Data Engineering, Sep./Oct. 2003, pp. 1155-1169, vol. 15, No. 5.

Rosenfeld, B., et al., "Clustering for Unsupervised Relation Identification", CIKM 2007 (Conference on Information and Knowledge Management), ACM, Nov. 6-10, 2007, pp. 411-418, Lisbon, Portugal.

Rozenfeld, B., et al,. "High-Performance Unsupervised Relation Extraction from Large Corpora", Proceedings of the 6th IEEE International Conference on Data Mining (Hong Kong) (ICDM), 6 pages, 2006.

\* cited by examiner

Mr. Smith will be out of the office until Monday. During this time, he may be reached at (123) 456-7890

Hello Fred, thank you for taking the time to talk to me today. If you would like more information regarding the products ABC, Inc. has to offer, please do not hesitate to contact me at (111) 222-3333. Sincerely,
Alice.

FIG. 1

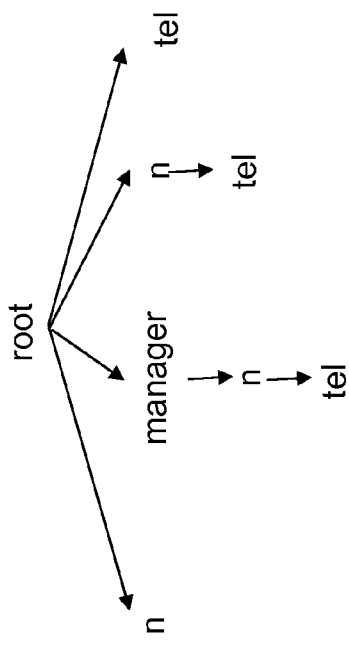
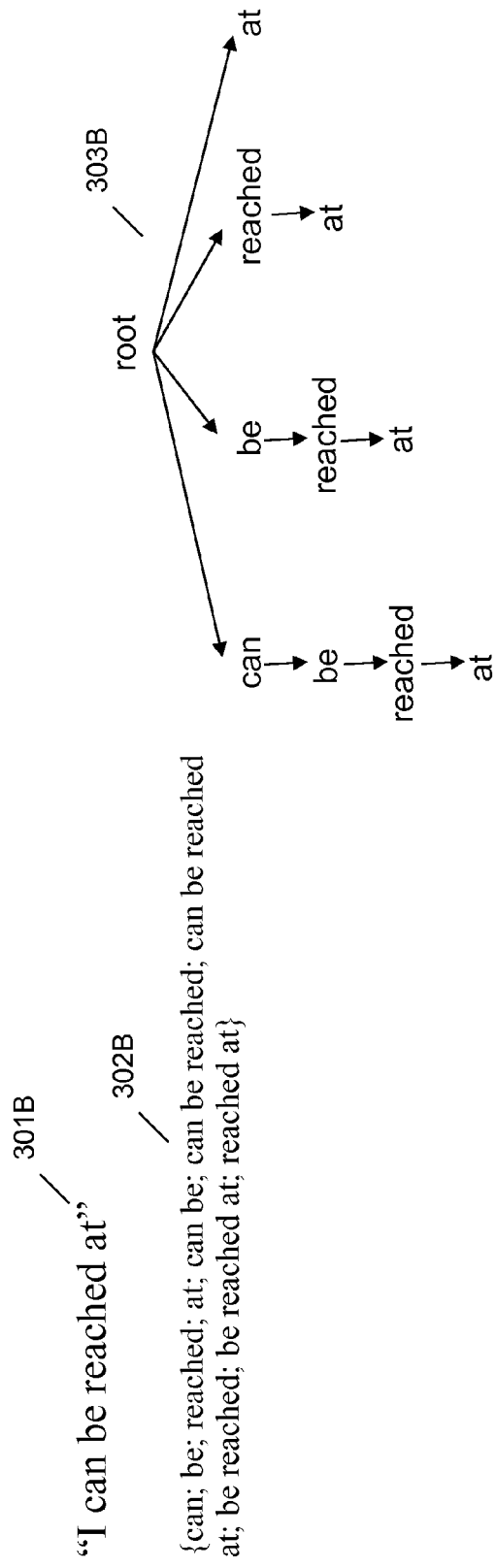
FIG. 3A
FIG. 3B

"can be reached at" — 401

| sequence | count |
|---|---|
| can | 20 |
| at | 686 |
| be reached | 15 |

402

| sequence X | sequence Y | co-count |
|---|---|---|
| can | be reached | 15 |
| be reached | at | 15 |
| can | at | 20 |

403

$$p(x) = \frac{20}{2966} \quad p(y) = \frac{15}{2966} \quad p(x,y) = \frac{15}{2966}$$

404

| sequence X | sequence Y | "→" | "←" |
|---|---|---|---|
| can | be reached | 0.946 | 0.750 |
| be reached | at | 0.022 | 0.277 |
| can | at | 0.029 | 0.293 |

$$U(x|y) = \frac{(15/2966)\log((15/2966)/(20/2966)*(15/2966))}{-(15/2966)\log(15/2966)}$$

$$U(y|x) = \frac{(15/2966)\log((15/2966)/(20/2966)*(15/2966))}{-(20/2966)\log(20/2966)}$$

FIG. 4

Person-Position 602

{as}
. She also serves as a
Hudson. He also serves as a
Served as
Will resign as
Currently serves as a
Retired as
Serves as

{was}
Was appointed
Was elected
Was named

{is}
is
Is an
Is currently
. He is
Is also
Is retired and was formally the

Person-Phone 601

{office}
/n Office Nbr:
/n office
Monterrey /n Office:
Front Office

{number}
number is
His number is
work number:

{president}
President ABC University
/n Vice President; RAC /n
. President
/n Vice President – Investments /n
/n Account Vice President /n

FIG. 6

| Context String | Trie Sequence Set | After Subsumed | After Drop Rules | After Final Pruning |
|---|---|---|---|---|
| "n event manager \n tel" | {n: manager \n tel; tel: tel} | {n: manager \n tel} | {manager \n tel} | {\n: tel} |

FIG. 8

| Original Context Text | Semantic Signature |
|---|---|
| 's number is | number |
| and her phone number is | number |
| ; number: | number |
| 's cell number | number |
| at | at |
| with at questions at | at |
| tomorrow at | at |

FIG. 9

| Size | Sample Original Context Text | Semantic Signature |
|---|---|---|
| 19 | 's number is | number |
| 2 | \n \n Domestic Number: | domestic number |
| 1 | He said the number is | number is |

FIG. 10

Company A (NYSE: CMA)

XYZ Corp. (TYO: 1234), or XYZ

International Technology Corporation (NYSE: ITC), abbreviated ITC and nicknamed "Tech"

National Petroleum Corporation (a subsidiary of Petroleum Exploration, Inc., LSE: NPC)

1201

(Capitalized Word\+s)+ \(?({NYSE, TYO, LSE}:\s)

1202

- Find AllCapitalizedWord
- Identifying 10 words to the left of AllCaptilizedWord matches as left context
- Grouping left context to find pattern for identifying stock ticker symbols.

```
SELECT    P.match as country,
          LeftContextTok(P.match,10) as lc,
          RightContextTok(P.match,10) as rc
INTO      Header
FROM      Dictionary('country.dict',DocScan.text) P
WHERE     Contains(lc, 'ABC')
```

1301

ABC Travel Per Diem <country> home
You and ABC – <country>| Per Diem
You and ABC – <country>(Per Diem)

SYSTEMS AND METHODS FOR INFORMATION EXTRACTION USING CONTEXTUAL PATTERN DISCOVERY

BACKGROUND

Information extraction (IE) is a process for analyzing and extracting structured information from unstructured or semi-structured text. Typically, IE systems are configured to focus on a specific domain or particular types of events, entities, or relationships. For example, an IE system may be constructed to analyze certain news stories, such as mergers or criminal activity, financial reports, legal opinions, press releases, and relationships between entities in a series of email messages. IE analysis results may take multiple forms, such as entity identification (e.g., persons, corporations, organizations), relationship identification (e.g., person-employer, merging companies), and co-reference resolution, which resolves different identities for a common entity (e.g., United States, United States of America, U.S., America).

Many different techniques have been used to analyze text and to particularize IE processes for various domains. However, one characteristic that these techniques have in common is that they involve a manual component, wherein an individual is involved in discovering the patterns and relationships necessary for the IE process to retrieve information from a corpus of text. Each particular manual component influences the outcome of an IE analysis, for example, by setting patterns that will be examined during the analysis. However, manual components also typically introduce inefficiencies and inaccuracies into the overall IE process.

BRIEF SUMMARY

In summary, one aspect provides a system comprising: at least one processor; and memory device operatively connected to the at least one processor; wherein, responsive to execution of program instructions accessible to the at least one processor and configured to automatically discover at least one pattern in at least one text corpus, the at least one processor is configured to: extract at least one context string related to at least one annotator from the at least one text corpus; analyze the at least one context string for at least one sequence, the at least one sequence comprised of at least one subsequence; determine at least one sequence signature for each at least one sequence by applying applicable rules to the at least one sequence; and group the at least one sequence signature into at least one group.

Another aspect provides a method comprising: automatically discovering at least one pattern in at least one text corpus, wherein discovering at least one pattern comprises: extracting at least one context string related to at least one annotator from the at least one text corpus; analyzing the at least one context string for at least one sequence, the at least one sequence comprised of at least one subsequence; determining at least one sequence signature for each at least one sequence by applying applicable rules to the at least one sequence; and grouping the at least one sequence signature into at least one group.

A further aspect provides a computer program product comprising: a computer readable storage medium having computer readable program code configured to automatically discover at least one pattern in at least one text corpus embodied therewith, the computer readable program code comprising: computer readable program code configured to extract at least one context string related to at least one annotator from the at least one text corpus; computer readable program code configured to analyze the at least one context string for at least one sequence, the at least one sequence comprised of at least one subsequence; computer readable program code configured to determine at least one sequence signature for each at least one sequence by applying applicable rules to the at least one sequence; and computer readable program code configured to group the at least one sequence signature into at least one group.

The foregoing is a summary and thus may contain simplifications, generalizations, and omissions of detail; consequently, those skilled in the art will appreciate that the summary is illustrative only and is not intended to be in any way limiting. For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1 provides an example of relationship extraction in an IE process.

FIG. 4 provides an example of statistics of sequences according to an embodiment.

FIG. 6 provides examples of groups.

FIG. 9 provides a table illustrating sample entries from two clusters of relation candidates generated according to embodiments of S2C.

FIG. 10 provides an example of merging clusters according to an embodiment.

FIG. 12 provides an example of grouping annotations according to context according to an embodiment.

FIG. 13 provides an example of grouping annotations by both left and right contexts according to an embodiment.

DETAILED DESCRIPTION

Figure 2:
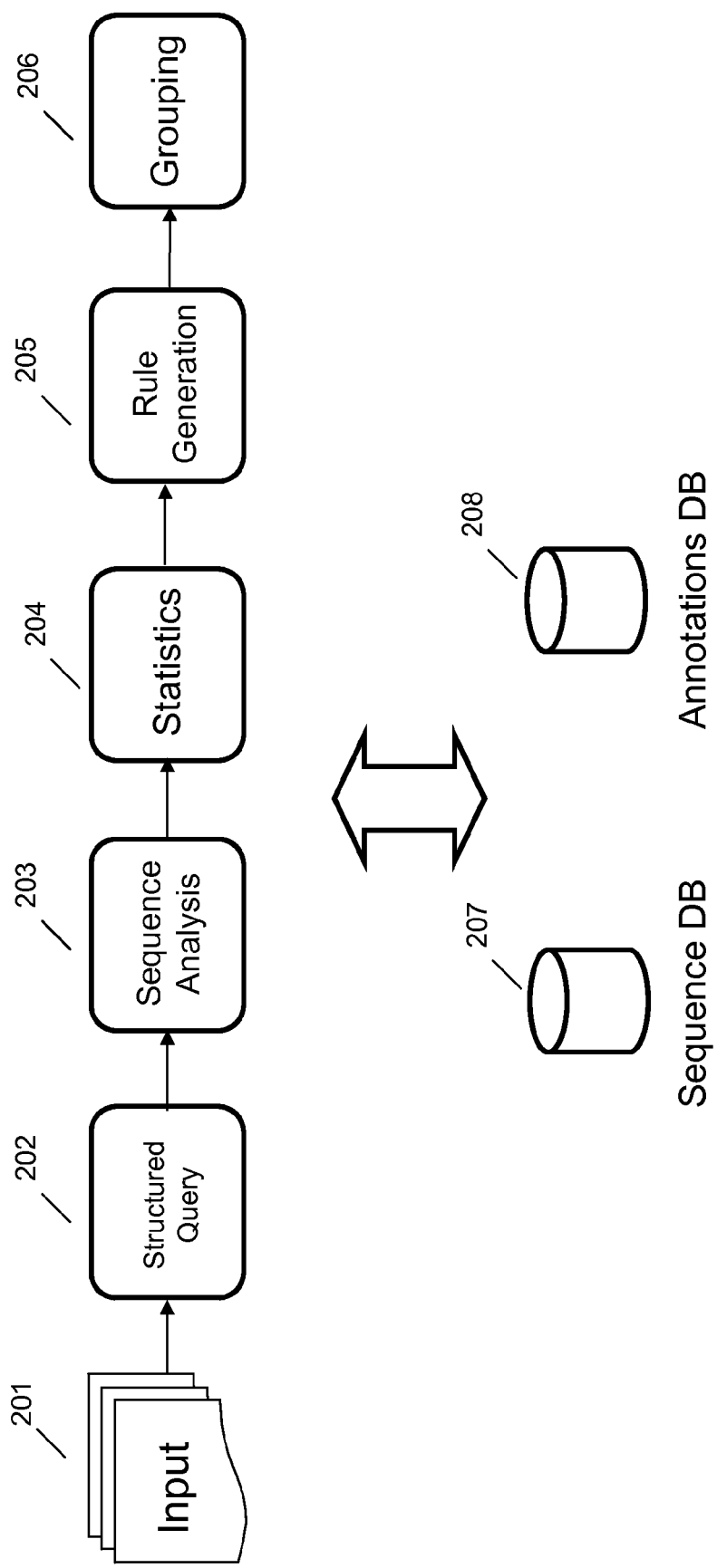
FIG. 2 provides an example flow diagram of a pattern discovery process for IE according to an embodiment FIGS. 3A and 3B provide example trie data structures.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of certain example embodiments.

Reference throughout this specification to an "embodiment" or "embodiment(s)" means that a particular feature, structure, or characteristic described in connection with the embodiment is included in at least one embodiment. Thus, the appearances of "embodiment" or "embodiment(s)" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid prolixity.

IE systems operate using one or more models that describe how to identify relevant target information in a subject corpus of text. One prominent type of IE model involves textual patterns, which are critical for practical IE. A textual pattern is a template designed to identify information of interest to be extracted from a text. Ideally, a textual pattern may be used to extract a large proportion of information of interest, while extracting very little information not of interest. Although many forms of textual patterns exist, in general, they comprise regular expressions over words and features of those words. A textual pattern may match sequences of characters or features of words. For example, the sentences "John goes to the store" may be covered by the textual pattern "PERSON VERB*LOCATION," wherein * is a wildcard matching any single word.

Relation extraction is a primary type of IE that involves detecting and classifying meaningful relations between entities in text. Identifying textual patterns is critical for practical relation extraction. For example, the text fragment "please call Alice from Company Inc. at her cell phone (123) 456-7890" contains the employee-of relation "Alice from Company Inc." and the person-phone relation "Alice . . . at her cell phone (123)456-7890". Relation extraction is important for many applications, such as information retrieval, question answering, and text entailment.

Extracting relationships as part of an IE process often involves discovering domain specific relationships, such as patterns between two annotations. Given two annotations, a relationship extractor may determine whether the two annotations are related, and if related, how. FIG. 1 provides a common example involving the joining instances of persons with their phone numbers. In FIG. 1, each name in the subject text has been located and is enclosed within a box and each phone number has also been located and is enclosed within a circle. In addition, the underlined text in FIG. 1 demonstrates that text between located names and phone numbers, which may provide context, may be captured according to certain rules. For example, text related to names and phone numbers may be captured only if the number and the name are separated by a specific number of words.

Developing textual patterns involves many challenges, including the difficulty in manually remembering and sorting through the many slight variations that arise in subject texts, and that classical clustering does not capture semantics well. In addition, there is a great variety in text directed toward similar subject matter and a myriad of ways to convey similar information.

Approaches to developing textual patterns and annotators according to existing technology typically involves defining base annotators (e.g., person, phone, organization, etc.), collecting contexts around base annotators in a subject corpus, discovering patterns, such as by grouping together similar text, and compiling rules to create relationship annotators based on the discovered patterns. However, the pattern discovery step is currently a manual process, requiring an individual to sift through the annotators and associated contexts in order to discover patterns. For example, current manual pattern discovery processes typically involve the following steps: (1) notice a pattern in corpus; (2) find more instances of the pattern; (3) find patterns with high frequency in corpus; (4) generate general expression to extract pattern; (5) look through results and revise general expression; and (6) iterate as needed. As a result, existing approaches are hindered by inefficiencies and inaccuracies introduced during the manual pattern discovery step.

Most IE systems rely on knowledge engineering or on machine learning to generate the "task model" for relation extraction. In the knowledge engineering approach, the model is usually in the form of manually created extraction rules, whereas in the machine learning approach, the model is generally learned automatically from manually labeled training data in a supervised or semi-supervised fashion. While the machine learning approach has been popular in recent years, the knowledge engineering approach remains a widely adopted practical solution for relation extraction.

In the knowledge engineering approach, a rule developer manually examines the context between pairs of entities of interest (e.g. pairs of persons and phone numbers), determines whether the pair forms a meaningful relation, discovers textual patterns indicating relations manually, and then writes rules to incorporate the patterns observed.

For example, an obvious pattern for identifying person-phone relation is "person followed by 'at' followed by a phone number within the same sentence," which may be represented as $P_1$="⟨person⟩ .* at. * ⟨phone⟩." While $P_1$ may correctly identify person-phone relation such as "Alice at (123) 456-7890" and "Bob can be reached at (111) 222-3333", it also produces incorrect matches for text such as "John's assistant at x1234" and fails to identify correct matches such as "Jane's cell: (222) 333-4444." In order to account for the precision and recall, a rule developer would need to redefine $P_1$ (e.g. $P_2$="⟨person⟩ (can be reached)? at .* ⟨phone⟩"), as well as identifying additional patterns (e.g. $P_3$="⟨person⟩'s (cell|office|home)?: ⟨phone⟩").

As demonstrated by the example immediately above, existing pattern discovery methods are error-prone manual processes that can take days, or sometimes weeks, of work for writing rules for a single relation. Currently, it may take months to generate a reasonably working extractor. In addition, adding a new domain typically requires as much times as an original domain. Furthermore, random sampling may lead to missed patterns or rules, and there is currently not an efficient method to estimate how much of a particular dataset is covered by a pattern or rule.

Embodiments provide for an automatic pattern discovery process. According to embodiments, the process may automatically generate groupings over text and provide for configurable settings for grouping customization. In addition, embodiments provide for grouping along multiple aspects of the subject data. Furthermore, embodiments may define the normalization with declarative rules and derive rules automatically based on statistics in the text corpus.

An automatic pattern discovery process according to embodiments may be declarative in that it may provide justification for group membership for debugging purposes, may capture semantics of individual words and phrases, and may provide rules that allow for an explanation of results. According to embodiments, an automatic pattern discovery process may be configurable by giving choice over statistics measures and by allowing for manipulation of rules. For example, embodiments may allow for high-level configurations such as "treat highly correlated words as equal." Embodiments also provide that the automatic pattern discovery process may be scalable, for example, by providing for one or more of the following: allowing multiple process instances and groups to be simultaneously or contemporaneously active; avoiding redundant computations among different configurations; configuring normalization as a single-pass process; and deriving rules and statistics that do not need to be re-computed.

In FIG. 2, therein is provided an example flow diagram of a pattern discovery process for IE according to an embodiment. A corpus of text is obtained as input 301. For example, the input 201 may be a series of scientific journals, newspaper articles, financial reports, or emails. A structured query 202, representing, inter alia, extraction rules, is run on the input 201. As a non-limiting example, the structured query 202 may be expressed in a declarative language, such as AQL developed by International Business Machines Corporation (IBM®) as part of its SystemT, rule-based IE system. IBM is a registered trademark of International Business Machines Corporation. Results of the structured query 202 may be stored in one or more databases 207, 208, for example, a database storing annotations 208 extracted from the input 201.

According to embodiments, the structured query 202 on the input 201 may take any applicable form and may query for any applicable arrangement of information. An illustrative and non-restrictive example of a query provides that the query may be configured to select two developed annotators, for example, such that the relationship between the two annotators within the input may be analyzed. Embodiments provide that the example query may extract text between two annotations produced by annotators according to certain configurable conditions, such as extracting text between annotations produced by annotators with a maximum threshold of distance (i.e., text) between the annotators. The following provides an example query according to an embodiment that may serve to examine relationships between persons and phone numbers within a corpus:

<Person>[SpanBetween where Follows (person, phone, 0, 40)]<Phone>
Annotators: Person, Phone
Max threshold: 40 characters.

In general, the example query will analyze a corpus for relationship annotators involving persons and phone numbers, extracting text between the annotators under the maximum threshold of 40 characters. In a non-limiting example, if the example query were run on a input consisting of a corpus of corporate emails, annotations may be returned involving text found between a located name and phone number, such as the following: "she can be reached at," "I can be reached at," "can be reached at," and "can also be reached."

The input query 202 results are used by the sequence analysis 203 step of the process, which, according to embodiments, analyzes query results for a series of key words that may describe the context strings comprising the query results. A non-limiting example of a text set sequence is "\n Event Manager \n Tel:," where "\n" is the newline character. This text may be conventionally written as follows:

Event Manager
Tel:

The example text set sequence may be recognized as part of a typical email signature. From this non-limiting example, the following illustrative sequence may be derived: {event; manager; \n; tel; event manager; manager \n; An tel, tel:}.

According to embodiments, sequence analysis 203 may analyze sequences based on configurable values. A non-limiting example of a configurable value is the frequency of instances in extracted text. For example, the following instances and their frequencies may be located: (event—1, manager—58, tel—87). Embodiments provide that a configurable value may be available such that only frequencies over a certain threshold, such as 10 instances, are provided. Such a configuration would produce the following list of instances from the list provided above: (manager—58, tel—87). In another illustrative and non-restrictive example, a configurable value may be provided according to embodiments that specifies the number of words or characters that make up a sequence, such as only providing sequences comprised of single words.

As shown in FIG. 2, sequences obtained through sequence analysis 203 may be stored in one or more data bases 207, 208 in various data structure forms. Preferred embodiments provide for storing sequences in a trie data structure, as shown in FIG. 3A for the sequences "\n", "manager \n tel", "\n tel", "tel". Each branch in the trie data structure provided in FIG. 3A represents one sequence. Another sequence analysis example according to embodiments is illustrated in FIG. 3B. The example sequence 301B is "I can be reached at," and is broken out into a frequent sequence 302B set. In addition, the example sequence 301B may also be stored in a trie data structure 303B.

Referring again to FIG. 2, once all of the sequences are analyzed and/or stored appropriately, statistics 204 may be performed. Embodiments provide for the use of any relevant statistical analysis, including, but not limited to, the following: count, #(x), the number of times a sequence x occurs in an annotation; co-count, #(x,y), the number of times a sequence pair, such as sequence x and y, occurs in an annotation; and the uncertainty coefficient, which is a measure of the dependence of two sequences.

The uncertainty coefficient may be expressed according to the following:

$$U(y \mid x) = \frac{I(x, y)}{H(y)} = \frac{p(x, y)\log\frac{p(x, y)}{p(x)p(y)}}{-p(y)\log p(y)},$$

where p(x) is the probability of x, p(y) is the probability of y, and p(x,y) is probability of the sequence pair x and y occurring in the same sequence. The probability of a sequence (i.e., p(x), p(y)) may be determined by dividing the count of that sequence by the total number of sequences for the corpus, while the probability of a sequence pair (i.e., p(x,y)) may be determined by dividing the count of the co-occurrence of the sequence pair by the total number of sequences for the corpus. In addition, when calculating the uncertainty coefficient, I (x, y) represents the mutual information between x and y, while H(y) is the entropy of y. The uncertainty coefficient U(x|y) represents the proportion of information in x that is shared with y. If H(x|y) is close to unity, x may be replaced by y and most of the available information will be retained. Once the uncertainty coefficient U(x|y) is calculated for all pairs of frequent sequences x, y, sequences whose information is largely covered by other sequences may be selectively dropped.

Referring to FIG. 4 therein is depicted an example of statistics of sequences according to an embodiment. FIG. 4 involves the example sequence 401 "can be reached at," which is broken down into subsequences and related statistics involving the number of times each component appears in the input corpus 402. Embodiments may ascertain the count of subsequences in relation to each other and probabilities may be generated from this information 503. In addition, embodiments may determine one or more uncertainty coefficient values for the subsequences 504.

As depicted in FIG. 2, embodiments provide for rule generation 205, for example, following the compilation of statistics 204. Non-limiting examples of rule formats according to embodiments are "DROP sequence x IF sequence x AND sequence y" and "DROP sequence y IF sequence y AND sequence x." In addition, embodiments provide for rule generation based on configurable settings. As a non-limiting example, rules may be generated based on certain uncertainty coefficient values, such as the following: IF U(x|y) OR U(y|x) >0.25, generate rule. In this example, if 25% of the information for x is shared with y, generate or use one or more rules, or if 25% of the information for y is shared with x, generate or use one or more rules. In addition, embodiments provide that there may be instances where no rule is generated or applicable. As such, the disclosure of applying rules according to embodiments herein may involve instances of only applying "applicable" rules or applying no rules at all.

Another illustrative and non-restrictive example involves the sequences "\n," and "manager \n tel" and corresponding uncertainty coefficients of U(\n|manager \n tel)=0.75 and U(manager \n tel|\n)=0.75. In this example, rules may be generated such as "DROP \n IF \n AND manager \n tel" and "DROP manager \n tel IF manager \n tel AND \n." According to embodiments, configurable settings may be provided to apply rules in certain arrangements, such as applying rules in order of greater uncertainty coefficient.

Figure 5:
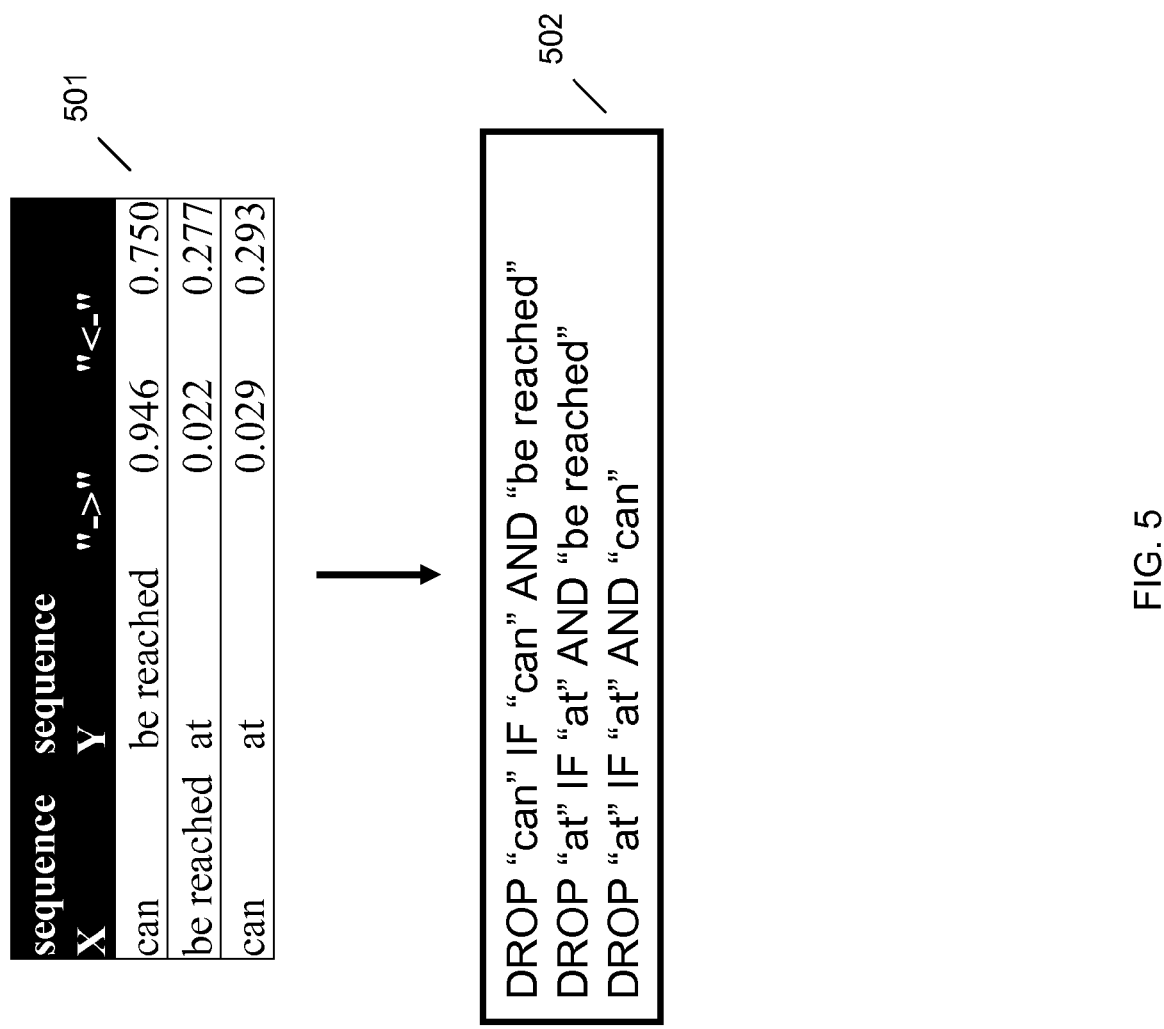
FIG. 5 provides an example of rule generation according to an embodiment.

Referring to FIG. 5, therein is depicted an example of rule generation according to an embodiment. In the example illustrated in FIG. 5, uncertainty coefficient values have been determined for a set of sequences 501. A set of rules is generated 501 based on the uncertainty coefficient statistics.

Also shown in FIG. 2 is a grouping step 206 wherein sequence signatures are pulled from the stored data structures, such as the trie data structure illustrated in FIGS. 3A and 3B. When pulling a signature, subsumed sequences are not included. A subsumed sequence is a sequence that is contained within a longer sequence. Referring to FIG. 3A, the sequence "\n→tel" is subsumed within "manger→\n→tel," and, as such will be removed, or pruned, from the data structure. In addition, during grouping 206, sequence signatures may be further pruned using rules generated during rule generation 205.

According to embodiments, a hash table may be generated based on the final signature sequence and extracted text may be grouped based on the final signature sequence hash. Embodiments provide that grouping 206 may be configurable, such as by providing configurable settings and grouping different group sizes. The order of performing configurable settings and grouping different group sizes may vary and may be repeated; however, an exemplary embodiment provides for performing configurable settings followed by grouping different group sizes.

As a non-limiting example, grouping 206 may have configurable settings for including infrequent words in the final signature, running generated rules twice, and disabling a specified sequence distance for a default or preferred distance, including, but not limited to, the Jaccard Distance between signature sequences. According to embodiments, the configurable setting of running generated rules twice may comprise a first pass on the original sequence set (e.g., {\n; manager \n tel; tel}) and a second pass on a split sequence set (e.g., {\n; manager; tel}). Embodiments provide for grouping different group sizes, such as grouping the smallest groups (e.g., size=1-2) with the largest groups (e.g., size >9). An exemplary embodiment may use the Jaccard Distance between group signature sequences to join the small groups with larger groups; however, this is only an exemplary embodiment and other distances and methods may be used to join groups.

Figure 7:
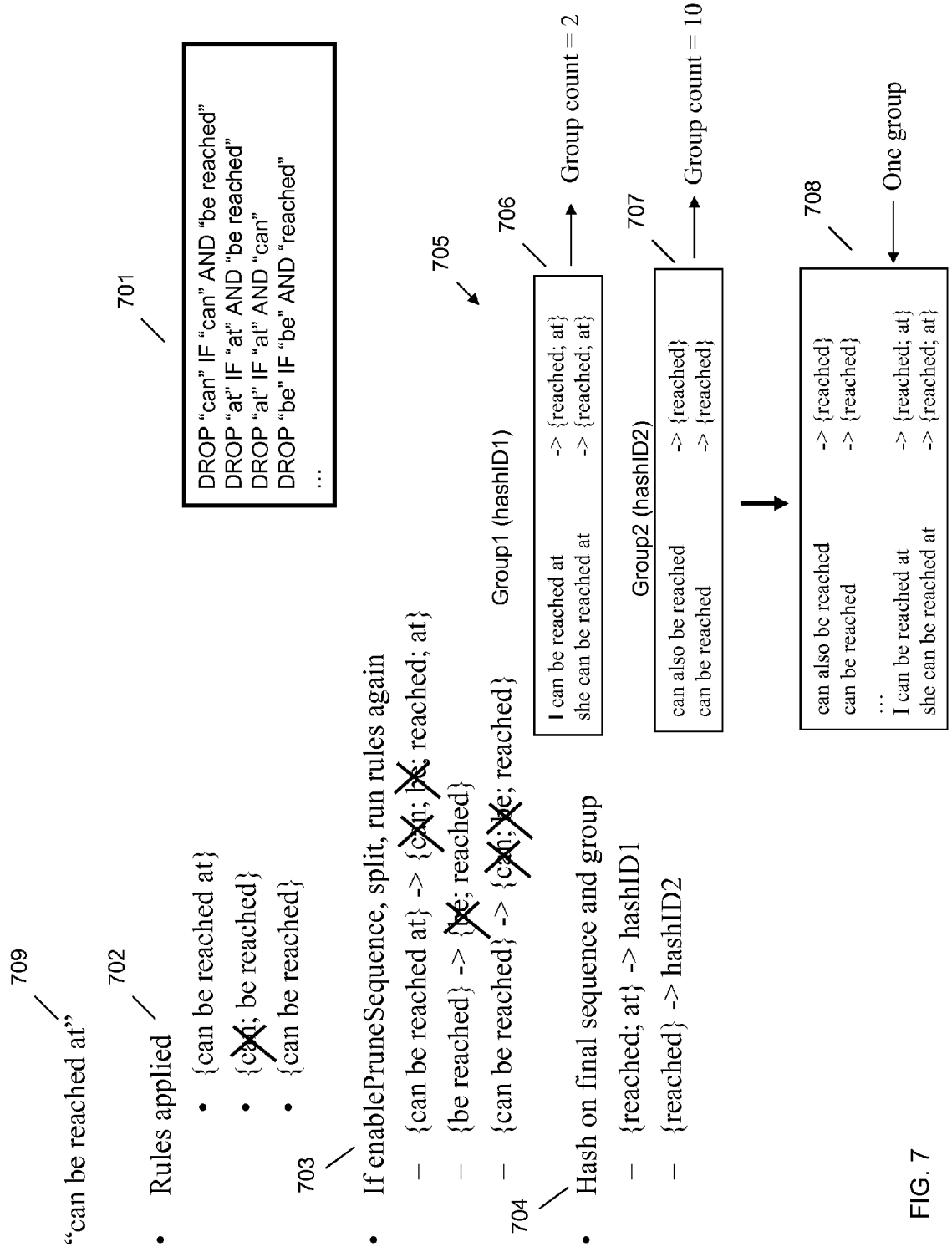
FIG. 7 provides an example of grouping and hash table generation according to an embodiment FIG. 8 an example of Semantic-Signature-based Clustering (S2C) steps according to an embodiment.

Example groups according to an embodiment are provided in FIG. 6. A first group 601 concerns a person-phone relationship, while a second group 602 concerns a person-position relationship. Referring to FIG. 7, therein is depicted an example of grouping and hash table generation according to an embodiment. In FIG. 7, the subject sequence is "can be reached at" 709. A set of rules 701 has been generated and is applied to the sequence 702. In the example shown in FIG. 7, grouping 703 occurs using configurable settings, including running the generated rules on the sequence, splitting the sequence, and running the rules again. After grouping 703, embodiments provide for generating a hash table 704 on the final groups, wherein each group is given a hash ID and inserted into the hash table 705. According to embodiments, certain configurable settings may be applied, such as grouping based on Jaccard Distance between sequence signatures. As shown in FIG. 7, if, for example, a first group 706 had a group count of 2, while the second group 707 had a group count of 10, embodiments provide that these may be structured as one single group 708.

Embodiments are arranged for rule-based grouping providing, inter alia, configurable data aspects, declarative capture semantics of individual words and phrases, and grouping that is scalable to many instances and many groups. In addition, embodiments may process an input corpus by defining the normalization with declarative rules, deriving features of the input corpus documents, and computing normalizations on features sets based on the generated rules and statistics. Furthermore, embodiments facilitate pattern discovery for relation extraction for certain systems, such as knowledge engineering based systems. Embodiments provide for grouping similar strings from an input corpus and generating meaningful patterns.

Embodiments provide for Semantic-Signature-based Clustering (S2C) for grouping the context between pairs of entities to assist in the discovery of patterns for relation extraction. According to embodiments, the input to the system may be comprised of two sets of entities, $E_1$ and $E_2$, and a set of relation candidates (pairs of entities) $C \subset E_1 \times E_2$ for relation R. In addition, the input may include a set of contexts $S_C$, consisting of context strings $s_c$ appearing within a vicinity of the relation candidate $c=(e_1, e_2) \in C$ (e.g. the sentence where both $e_1$ and $e_2$ occur). S2C according to embodiments may generate disjoint clusters $E=C_1 \cup C_2 \cup \ldots \cup C_n \cup O_t$. Each cluster $C_i$ corresponds to a set of context strings that can be represented by a distinct string pattern called Semantic Signature $sig_i$ to identify the relation R either positively or negatively. The special cluster $O_t$ (for "Orphan") gathers all the candidates that can not be clustered into clusters with size above a predefined threshold t.

Embodiments provide for an S2C process comprised of two main stages: (1) identifying the semantic signature of all context strings; and (2) clustering of context strings based on their semantic signatures. According to embodiments, the first stage may be comprised of sequence analysis, identifying subsequence association, and generating semantic signatures components.

According to embodiments, the sequence analysis component operates to prepare the information necessary to generate semantic signatures for the context associated with each relation candidate. A context string may be comprised of a sequence of words or tokens. Embodiments provide that the semantic signature of a context string may satisfy the following two conditions: (1) it should be the most informative subsequence(s) of tokens that identifies the relation candidate; and at the same time (2) it is shared by the most number of context strings of other relation candidates. The second condition implies that S2C may benefit from subsequence(s) of tokens in a semantic signature being a frequent sequence. As such, identifying frequent sequences of tokens may be necessary.

Embodiments provide that sequence analysis may be performed to identify candidate subsequences of tokens for set of relation candidate C through the following steps: (1) each given context string $str_e$ is first tokenized into a token sequence s; (2) all subsequences of s are obtained and counted; (3) subsequences with frequency lower than $freq_{min}$ are removed; and (4) subsequences not within the threshold of sequence size ($size_{(min,max)}$) are also removed. These steps may define a frequent sequence set $S(C, freq_{min}, size_{(min,max)})$.

The identifying subsequence association step involves removing certain sequences from the generated set of sequences, such as the frequent sequence set $S(C, freq_{min}, size_{(min,max)})$. The set of frequent sequences $S(C, freq_{min}, size_{(min,max)})$ may be very large. As such, in order to obtain the most informative sequences, those that are less informative need to be removed. Embodiments provide that sequences may be removed according to certain observances concerning the set of sequences acquired during the sequence analysis step. As a non-limiting example, many subsequences are redundant as they always or nearly always occur together with certain other subsequences in the context strings. Embodiments provide for determining the uncertainty coefficient for different subsequences and dropping certain sequences according to generated rules, such as "DROP sequence x IF sequence x AND sequence y" and "DROP sequence y IF sequence y AND sequence x" IF U(x|y) OR U(y|x)>0.25.

The generating semantic signatures step according to embodiments provides for pruning frequent sequences in a context string. According to embodiments, generating semantic signatures involves removing subsumed sequences, as described above, and applying the generated drop rules to the remaining sequences. Embodiments may further provide for additional pruning. As a non-limiting example, additional pruning may involve taking larger sequences and splitting them into sequences of a certain length (e.g., length=1) and reapplying the generated drop rules. As such, this non-limiting example may be applied to an illustrative sequence set {\n; manager \n tel}, with a first drop rule of "DROP {\n} IF {\n} AND {manager \n tel}" and a second drop rule of "DROP {manager} IF {tel} AND {manager}. For the illustrative sequence set, the first drop rule would apply, but the second drop rule would not apply. Once the illustrative sequence is split into {manager; \n; tel}, the second drop rule may be applied, generating a final sequence string of {\n; tel}, which may be a good representative context string and the final $sig_i$ of $S_C$. Referring to FIG. 8, therein is depicted an example of the S2C steps according to an embodiment being carried out on an illustrative context string.

According to embodiments, the second S2C step provides for generating the final clusters of relation candidates for the purpose of pattern discovery. Embodiments provide that this second step may be comprised of using semantic signature and clustering small groups methods. The using semantic signature method according to embodiments provides for grouping all the relation candidates associated with the same semantic signature into the same cluster, and grouping different semantic signatures into different clusters. In addition, embodiments provide that any cluster size smaller than a predefined threshold t may be reassigned to a special cluster $O_r$. FIG. 9 provides a table illustrating sample entries from two clusters of relation candidates generated according to embodiments of S2C.

The clustering small groups method according to embodiments provides for, inter alia, pruning based on cluster size. A non-restrictive and illustrative example provides that for each original cluster $C_{O_r^i}$ in $O_r$ with size smaller than reclustering threshold $t_s$ ($t_s \leq t$), if a cluster $C_j$ with size larger than $t_l$ ($t_l \geq t$) can be found such that $sim(sig(C_{O_r^i}); sig(C_j))>s$, where sim is a string based similarity measure and s is a predefined similarly threshold, $C_{O_r^i}$ may be removed from $O_r$ and added to $C_j$. In FIG. 10, therein is depicted example clusters that, when given $t_s=3$, $t_l=9$ and sim is the Jaccard Distance, may be merged into one according to embodiments.

Figure 11:
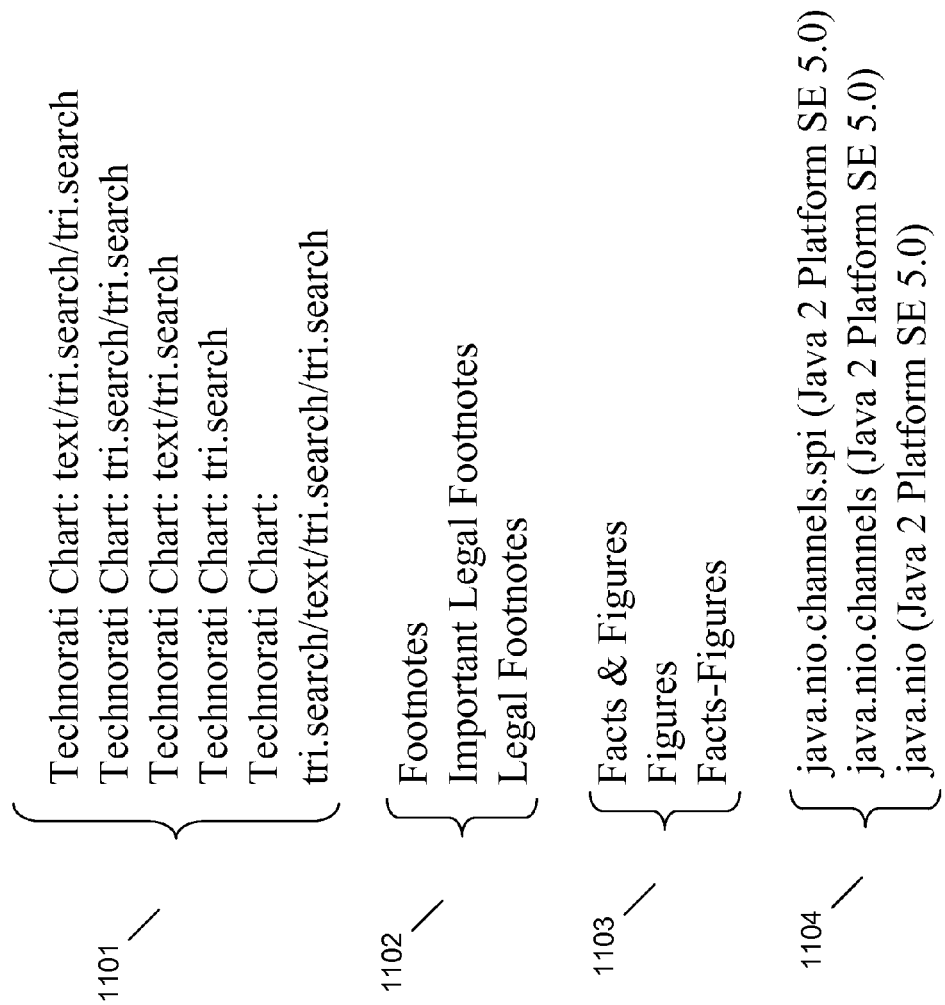
FIG. 11 provides an example of grouping according to an embodiment.

Although examples included herein may be directed towards certain IE models, such as relation extraction, embodiments are not so limited. Embodiments may operate with any context string generated using one or more queries described herein. For example, in FIG. 11, therein is depicted an example of grouping annotations by themselves according to an embodiment, such as for finding patterns of certain categories of web sites as shown through groups 1101-1104. FIG. 12 provides an example of grouping annotations according to context as provided in an embodiment, wherein annotations are grouped by their left context in order to find patterns to identify stock ticker symbols. Depicted in FIG. 12, stock ticker symbols are determined for entities contained in company information 1201, utilizing a pattern 1202 applied according to a set of selection and grouping steps 1203. Referring to FIG. 13, therein is depicted an example of grouping annotations by both their left and right contexts. In FIG. 13, a query 1301 is directed toward obtaining all matches of words from a text (i.e., country. dict) along with their left and right contexts, if they contain the term "ABC." The query results 1302 are grouped by left and right context, where, for example, the <country> instances are the country annotations generated by the country annotator provided in the query 1301.

Embodiments provide for automatic pattern discovery for IE processes. In addition, automatic pattern discovery according to embodiments may be configurable, declarative and scalable. Multiple steps are described herein for automated IE pattern discovery, including, but not limited to, structured query on text input, sequence analysis of query results, generating statistics, configuring rules, and grouping sequences. As such, embodiments provide for IE without requiring manual processes, such as manual pattern matching processes and, therefore, are more efficient and accurate than currently known IE processes.

Figure 14:
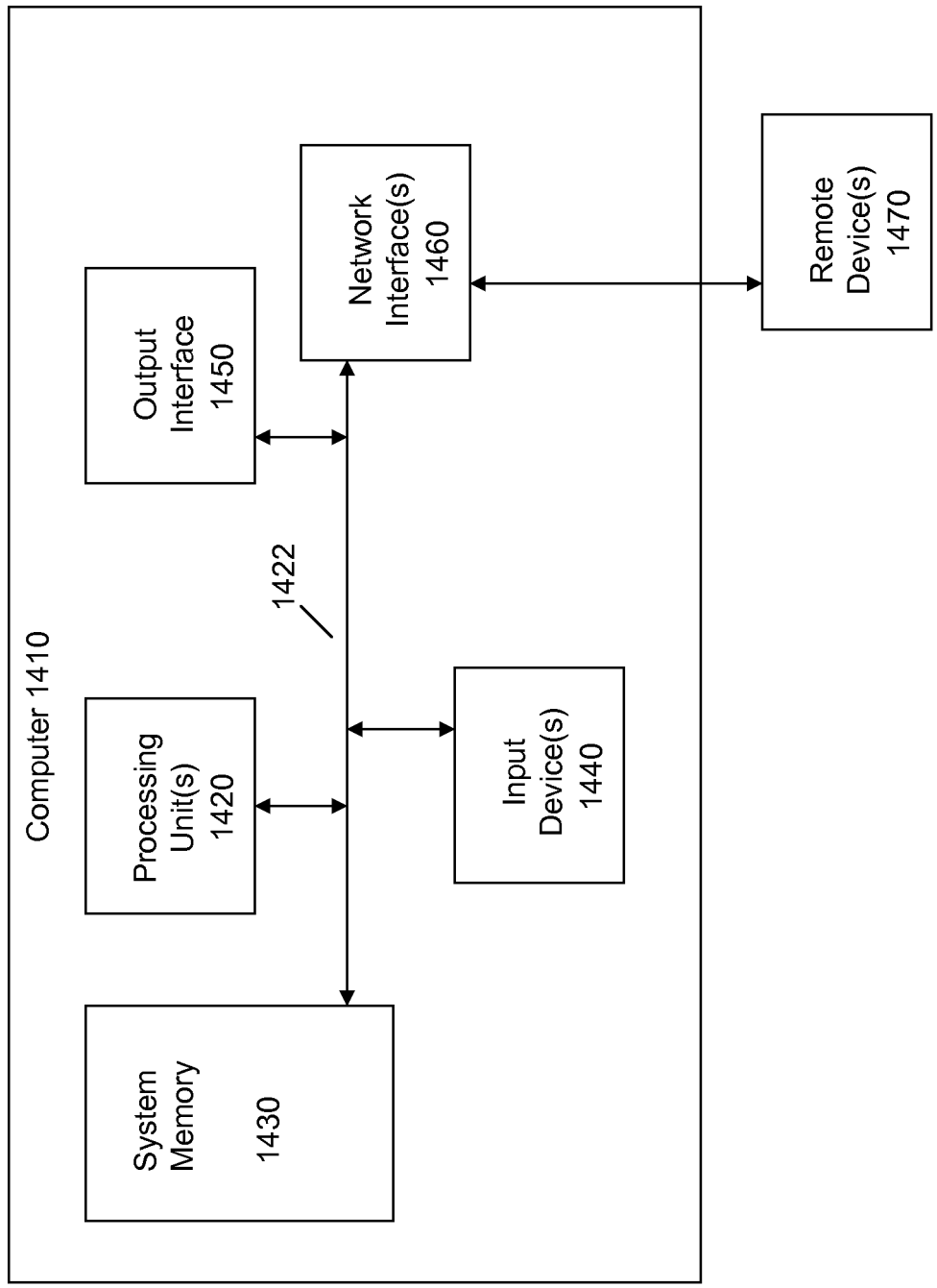
FIG. 14 illustrates an example computer system.

Referring to FIG. 14, it will be readily understood that embodiments may be implemented using any of a wide variety of devices or combinations of devices. An example device that may be used in implementing one or more embodiments includes a computing device in the form of a computer 1410. In this regard, the computer 1410 may execute program instructions; generate at least one information filter comprised of at least one information element; and process at least one source image using the at least one information filter, wherein processing the at least one source image comprises abstracting instances of the at least one information element detected in the at least one source image; and other functionality of the embodiments, as described herein.

Components of computer 1410 may include, but are not limited to, processing units 1420, a system memory 1430, and a system bus 1422 that couples various system components including the system memory 1430 to the processing unit 1420. Computer 1410 may include or have access to a variety of computer readable media. The system memory 1430 may include computer readable storage media in the form of volatile and/or nonvolatile memory such as read only memory (ROM) and/or random access memory (RAM). By way of example, and not limitation, system memory 1430 may also include an operating system, application programs, other program modules, and program data.

A user can interface with (for example, enter commands and information) the computer 1410 through input devices 1440. A monitor or other type of device can also be connected to the system bus 1422 via an interface, such as an output interface 1450. In addition to a monitor, computers may also include other peripheral output devices. The computer 1410 may operate in a networked or distributed environment using logical connections to one or more other remote computers or databases. In addition, Remote devices 1470 may communicate with the computer 1410 through certain network interfaces 1460. The logical connections may include a network, such as a local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, et cetera) or an embodiment combining software and hardware aspects that may all generally be referred to herein as a "circuit," "module" or "system." In addition, circuits, modules, and systems may be "adapted" or "configured" to perform a specific set of tasks. Such adaptation or configuration may be purely hardware, through software, or a combination of both. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like, conventional procedural programming languages, such as the "C" programming language or similar programming languages, and declarative programming languages such as Prolog and LISP. The program code may execute entirely on the user's computer (device), partly on the user's computer, as a stand-alone software package, partly on the user's computer and partly on one or more remote computers or entirely on the one or more remote computers or on one or more servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system comprising:
   at least one processor; and
   a memory device operatively connected to the at least one processor;
   wherein, responsive to execution of program instructions accessible to the at least one processor and configured to automatically discover at least one text-based pattern in at least one text corpus, the at least one processor is configured to:
   issue a query of the text corpus to extract at least one context string comprising a sequence of text from the text corpus, the sequence of text identified using a positional relationship to at least one text annotator corresponding to a text entity of interest included in text of the at least one text corpus;
   analyze the at least one context string to produce at least one sequence representing a text-based pattern of the context string;
   determine at least one semantic sequence signature for the context string from the at least one sequence which identifies the context string; and
   thereupon use the at least one semantic sequence signature to automatically group semantically similar context strings of the text corpus.

2. The system according to claim 1, wherein extracting at least one context string comprises querying the at least one text corpus using at least one structured query.

3. The system according to claim 2, wherein the at least one structured query comprises at least one annotator and at least one context condition for defining positional context of text of the text corpus with respect to the at least one annotator.

4. The system of claim 1, wherein semantically similar context strings share a common semantic sequence signature.

5. The system of claim 4, wherein, for a context string having more than one sequence, identifying the semantic signature for the context string from among the more than one sequence.

6. The system of claim 5, wherein the at least one processor is configured to output, for a plurality of semantically similar grouped context strings, a structured document comprising an original text context field and a semantic sequence signature field.

7. The system of claim 1, wherein the text corpus comprises one of unstructured text and semi-structured text.

8. A method comprising:
   automatically discovering at least one text-based pattern in at least one text corpus, wherein discovering at least one pattern comprises:
   issuing a query of the text corpus to extract at least one context string comprising a sequence of text from the text corpus, the sequence of text identified using a positional relationship to at least one annotator corresponding to a text entity of interest included in text of the at least one text corpus;
   analyzing the at least one context string to produce at least one sequence representing a text-based pattern of the context string;
   determining at least one semantic sequence signature for the context string from the at least one sequence which identifies the context string; and
   thereupon using the at least one semantic sequence signature to automatically group semantically similar context strings of the text corpus.

9. The method according to claim 8, wherein:
   extracting at least one context string comprises querying the at least one text corpus using at least one structured query; and
   the at least one text corpus is organized as a trie data structure.

10. A computer program product comprising:
    a computer readable storage medium having computer readable program code configured to automatically discover at least one text-based pattern in at least one text corpus embodied therewith, the computer readable program code comprising:
    computer readable program code configured to issue a query of the text corpus to extract at least one context string comprising a sequence of text from the text corpus, the sequence of text identified using a positional relationship to at least one annotator corresponding to a text entity of interest included in text of the at least one text corpus;
    computer readable program code configured to analyze the at least one context string to produce at least one sequence representing a text-based pattern of the context string;
    computer readable program code configured to determine at least one semantic sequence signature for the context string from the at least one sequence which identifies the context string; and
    computer readable program code configured to thereupon using the at least one semantic sequence signature to automatically group semantically similar context strings of the text corpus.

* * * * *